(12) United States Patent
Hussain et al.

(10) Patent No.: US 6,690,381 B1
(45) Date of Patent: Feb. 10, 2004

(54) METHOD AND SYSTEM FOR PERFORMING MULTI-TEXTURING OPERATIONS USING RECURSIVE INTERLEAVING

(75) Inventors: Zahid S. Hussain, San Jose, CA (US); Joseph J. Cheng, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 09/599,971

(22) Filed: Jun. 21, 2000

(51) Int. Cl.$^7$ .............................. G06T 17/00; G06T 1/00
(52) U.S. Cl. .................. 345/582; 345/423; 345/589; 345/614; 345/501; 345/505; 345/552
(58) Field of Search ............................... 345/418–423, 345/426, 428, 581–583, 586–589, 596–601, 606, 612, 613–614, 582, 618, 619, 629, 630, 501, 502, 503, 505, 506, 522, 530, 545–549, 552

(56) References Cited

U.S. PATENT DOCUMENTS

| | | | | |
|---|---|---|---|---|
| 5,835,096 A | * | 11/1998 | Baldwin | 345/582 |
| 5,852,443 A | * | 12/1998 | Kenworthy | 345/582 |
| 5,949,428 A | * | 9/1999 | Toelle et al. | 345/583 |
| 5,990,904 A | * | 11/1999 | Griffin | 345/583 |
| 6,111,584 A | * | 8/2000 | Murphy | 345/582 |
| 6,133,901 A | * | 10/2000 | Law | 345/611 |
| 6,252,610 B1 | | 6/2001 | Hussain | 345/506 |
| 6,259,460 B1 | * | 7/2001 | Gossett et al. | 345/552 |
| 6,392,655 B1 | * | 5/2002 | Migdal et al. | 345/382 |
| 6,483,505 B1 | * | 11/2002 | Morein et al. | 345/419 |

* cited by examiner

Primary Examiner—Matthew C. Bella
Assistant Examiner—Wesner Sajous
(74) Attorney, Agent, or Firm—Woodcock Washburn LLP (57) ABSTRACT

A system for performing multi-texturing operations includes a texture generation pipeline operable to receive a first graphics fragment and a second graphics fragment, to generate a first plurality of texels corresponding to the first fragment, and to generate a second plurality of texels corresponding to the second fragment. The system also includes a color pipeline coupled to the texture generation pipeline. The color pipeline is operable to receive the first and second graphics fragments and the first and second plurality of texels, and to generate a first color value for the first fragment and a second color value for the second fragment. The color pipeline is also operable to combine the first color value and the first plurality of texels, and to at least begin combining the second color value and the second plurality of texels during the combination of the first color value and the first plurality of texels.

25 Claims, 6 Drawing Sheets

METHOD AND SYSTEM FOR PERFORMING MULTI-TEXTURING OPERATIONS USING RECURSIVE INTERLEAVING

TECHNICAL FIELD OF THE INVENTION

This invention relates generally to computer systems and, more particularly, to a system and method for performing multi-texturing operations using recursive interleaving.

BACKGROUND OF THE INVENTION

Graphics textures add shading or other attributes to the surface of a graphics object, giving the object a realistic appearance. Computer systems perform texturing operations to map a graphics texture onto the graphics object. Multi-texturing involves mapping multiple textures onto the same graphics object. Multi-texturing is commonly used in computer games and other applications to produce high-quality graphics.

Multi-texturing often involves graphics images that are composed of many graphics primitives. Graphics primitives are shapes such as points, lines, circles, curves, or polygons that can be drawn, stored, and/or manipulated as discrete entities by a graphics program. Each graphics primitive may comprise one or more graphics fragments, which are small portions of a graphics primitive. Each fragment may, for example, comprise four pixels of a primitive. Multi-texturing operations are typically performed on the graphics fragments.

For each graphics fragment, the system produces a texel associated with a texture being mapped onto the fragment. The texel, or texture element, defines how a texture would appear when mapped onto the graphics fragment. If the system is mapping three textures onto a graphics object, for example, three texels are generated for each fragment. The system then maps each texture onto the graphics fragment by combining the fragment with each texel.

Computer systems have conventionally used multiple separate texture generation pipelines to produce these multiple texels. The first texture generation pipeline receives a graphics fragment and produces a texel for the first texture. The second texture generation pipeline receives the same graphics fragment and produces a texel for the second texture. The system then typically combines the graphics fragment with the texels one at a time.

A problem with this approach is that increasing the number of texture generation pipelines has conventionally resulted in an increase of the amount of hardware needed in the system. The use of separate texture generation pipelines for two or more texture operations increases the amount of hardware, which takes up space in and increases the expense of the system. Also, the texture generation pipelines share the same memory. As the number of pipelines increases, each pipeline's share of the memory decreases. The pipelines may be unable to perform some tasks if the memory requirements for those tasks exceed one pipeline's share of the memory.

In addition, the system typically processes only one graphics fragment at a time. The system combines the graphics fragment and the first texel, and then combines the result with the second texel. The system is unable to process multiple fragments at the same time, resulting in a higher system latency. The high latency may prevent the system from producing high-quality graphics in some applications. Typical images are comprised of many graphics primitives, and each primitive may be comprised of many graphics fragments. In games or other applications where graphics often change quickly, the system may be unable to process all of the fragments fast enough. The resulting image may lack some or all of the detail that would ordinarily appear if processing had been completed.

SUMMARY OF THE INVENTION

The present invention recognizes a need for an improved method and system for performing multi-texturing operations using recursive interleaving and seeks to reduce or eliminate at least some of the shortcomings of prior systems and methods.

In accordance with one aspect of the present invention, a system for performing multi-texturing operations comprises a texture generation pipeline operable to receive a first graphics fragment and a second graphics fragment, to generate a first plurality of texels corresponding to the first fragment, and to generate a second plurality of texels corresponding to the second fragment. The system also comprises a color pipeline coupled to the texture generation pipeline. The color pipeline is operable to receive the first and second graphics fragments and the first and second plurality of texels, and to generate a first color value for the first fragment and a second color value for the second fragment. The color pipeline is also operable to combine the first color value and the first plurality of texels, and to at least begin combining the second color value and the second plurality of texels during the combination of the first color value and the first plurality of texels.

Numerous technical advantages can be gained through various embodiments of the invention. Various embodiments of the invention may exhibit none, some, or all of the following advantages. Technical advantages of the present invention include the ability to produce texels for multiple textures using fewer texture generation pipelines. The use of fewer texture generation pipelines reduces the amount of hardware used by the system, reducing both the physical space occupied by the hardware and the expense of the system.

Another technical advantage of the present invention is the ability of the system to perform multi-texturing operations requiring large amounts of memory. By using fewer texture generation pipelines, the memory dedicated to each pipeline is greater. This reduces the likelihood that a graphics operation will exceed the memory capacity of the system.

A further advantage is the ability to process multiple graphics fragments at or near the same time. The invention allows multiple fragments to be combined with multiple texels without requiring complete processing of each fragment before beginning the next. The invention facilitates interleaving of the fragments to reduce system latency by allowing the system to perform overlapping multi-texturing operations. Since the system can process multiple graphics fragments at or near the same time, processing delay can be reduced, increasing the efficiency of the system.

The ability to perform more multi-texturing operations in a given time period allows the system to create higher quality graphics images than would otherwise be possible. The system may map textures onto the graphics objects faster, giving the system more time to perform other operations. Using this additional time, the system could, for example, map additional textures onto the same graphics object.

In addition, the ability to produce multiple texels for each graphics fragment and to recursively combine the texels and the graphics fragments allows any number of textures to be quickly mapped onto the fragments. The system may not be limited to a certain number of textures based on the number of texture generation pipelines provided in hardware.

The present invention may or may not accomplish all of the aforementioned advantages, depending on the particular details and inventive features implemented in a given embodiment. Particular embodiments implementing some of the inventive features may exhibit some, but not all, of the aforementioned advantages. Other embodiments may be constructed to realize all of the advantages discussed above. The absence of any particular advantageous feature is not intended to limit the scope of this invention.

Other technical advantages are readily apparent to one of skill in the art from the attached figures, description, and claims.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

Figure 1:
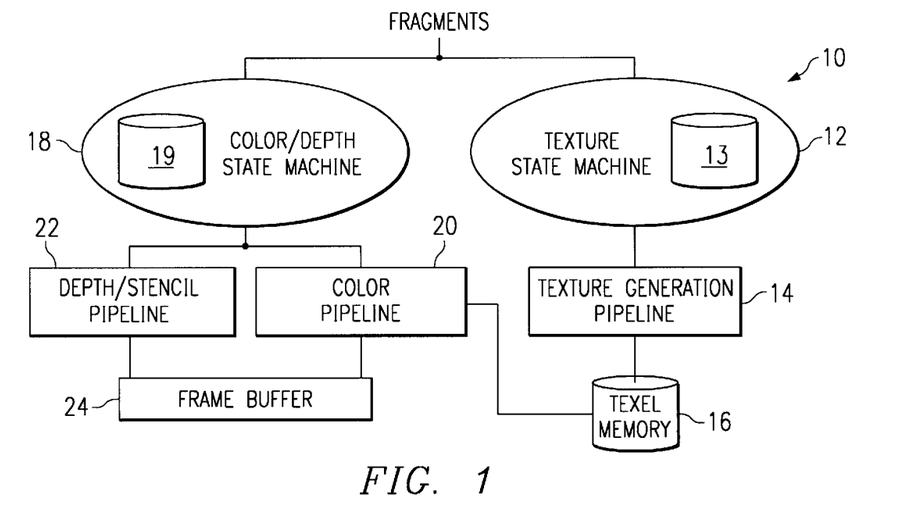
FIG. 1 is a block diagram illustrating an exemplary multi-texturing system constructed in accordance with the teachings of the present invention.

FIG. 1 is a block diagram illustrating an exemplary multi-texturing system 10 constructed in accordance with the teachings of the present invention. In the illustrated embodiment, system 10 includes a texture state machine 12, at least one texture generation pipeline 14, a texel memory 16, a color/depth state machine 18, a color pipeline 20, a depth/stencil pipeline 22, and a frame buffer 24.

In operation, system 10 receives and processes graphics fragments. In one embodiment, each graphics fragment comprises four pixels of a graphics primitive. Other embodiments of system 10 that process graphics fragments having different sizes may also be used without departing from the scope of the present invention.

System 10 operates to map one or more textures onto each graphics fragment. System 10 is operable to generate a texel for each texture mapped onto a graphics fragment and to combine the texel and the fragment. System 10 may map a single texture onto a graphics fragment by combining a single texel with the fragment. System 10 may also perform multi-texturing operations, combining a graphics fragment with multiple texels.

Texture state machine 12 receives graphics fragments from other components in system 10, stores the graphics fragments, and communicates the fragments to texture generation pipeline 14. In one embodiment, texture state machine 12 stores the graphics fragments in a memory 13. Texture state machine 12 may comprise any hardware, software, firmware, or combination thereof operable to store and communicate graphics fragments to texture generation pipeline 14.

In a particular embodiment, texture state machine 12 also generates and communicates a token to texture generation pipeline 14 with each graphics fragment. In this embodiment, texture generation pipeline 14 uses the token to identify a texture being mapped onto the graphics fragment. System 10 may, for example, identify different textures using numbers or alphanumeric codes. Texture generation pipeline 14 processes the fragment using the texture identified by the token. To generate multiple texels for the same graphics fragment, texture state machine 12 communicates the same graphics fragment to texture generation pipeline 14 multiple times, each time including a token identifying another texture being mapped onto the fragment.

Memory 13 stores graphics fragments in texture state machine 12. Memory 13 may also store the current value of a token associated with the graphics fragment. In one embodiment, memory 13 comprises a queue. Memory 13 may, however, comprise any of a variety of data structures, arrangements, or compilations operable to store and facilitate retrieval of information by texture state machine 12. Although memory 13 is depicted as residing within texture state machine 12, all or any portion of memory 13 could alternatively reside at another location or locations accessible to texture state machine 12.

Texture generation pipeline 14 receives graphics fragments from texture state machine 12 and generates at least one texel for each fragment. In one embodiment, texture generation pipeline 14 generates a texel for each texture being mapped onto a graphics fragment.

Figure 2:
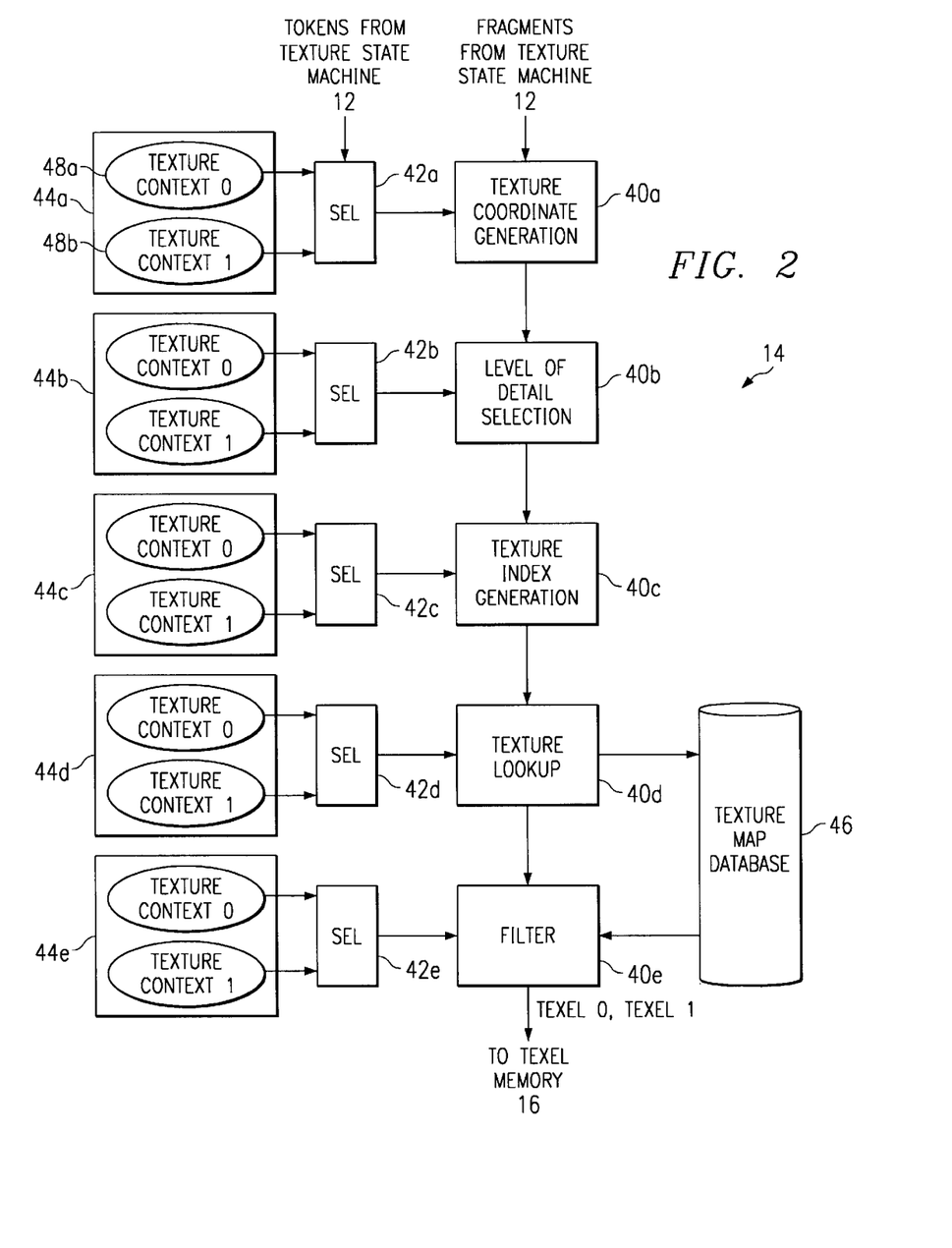
FIG. 2 is a block diagram illustrating an exemplary texture generation pipeline constructed in accordance with the teachings of the present invention.

In a particular embodiment, texture generation pipeline 14 receives a graphics fragment and a corresponding token from texture state machine 12. In this embodiment, texture generation pipeline 14 uses the token to identify a texture being mapped onto the graphics fragment, and that texture is used to generate a texel for the fragment. An example of this embodiment of texture generation pipeline 14 is shown in FIG. 2, which is described below.

Texel memory 16 is coupled to texture generation pipeline 14 and color pipeline 20. Throughout this document, the term "couple" refers to any direct or indirect connection between two or more elements. The elements said to be "coupled" to one another may or may not physically contact one another. Texel memory 16 stores texels generated by texture generation pipeline 14 and facilitates retrieval of the texels by color pipeline 20. In one embodiment, texel memory 16 includes a single queue, and each texel received by texel memory 16 is stored in the queue. In another embodiment, texel memory 16 may include multiple memory structures. In a particular embodiment, each texel in texel memory 16 is associated with a tag. The tag identifies the fragment used by texture generation pipeline 14 to generate that texel. The tag could, for example, equal the token produced by texture state machine 12 and used by texture generation pipeline 14 to produce the texel. Texel memory 16 may comprise any of a variety of data structures, arrangements, or compilations operable to store and facilitate retrieval of information by color pipeline 20.

Color/depth state machine 18 receives graphics fragments from other components of system 10, stores the graphics fragments, and communicates the fragments to color pipeline 20 and depth/stencil pipeline 22. In one embodiment, color/depth state machine 18 stores the graphics fragments in a memory 19. Color/depth state machine 18 may comprise any hardware, software, firmware, or combination thereof operable to store and communicate graphics fragments to color pipeline 20 and depth/stencil pipeline 22.

Color/depth state machine 18 may also delay the transmission of a graphics fragment to color pipeline 20 to allow color pipeline 20 to perform additional operations. After the delay, color/depth state machine 18 communicates the next fragment to color pipeline 20.

Memory 19 stores graphics fragments in color/depth state machine 18. In one embodiment, memory 18 comprises a queue. Memory 19 may, however, comprise any of a variety of data structures, arrangements, or compilations operable to store and facilitate retrieval of information by color/depth state machine 18. Although memory 19 is depicted as residing within color/depth state machine 18, all or any portion of memory 19 could alternatively reside at another location or locations accessible to color/depth state machine 18.

Figure 3:
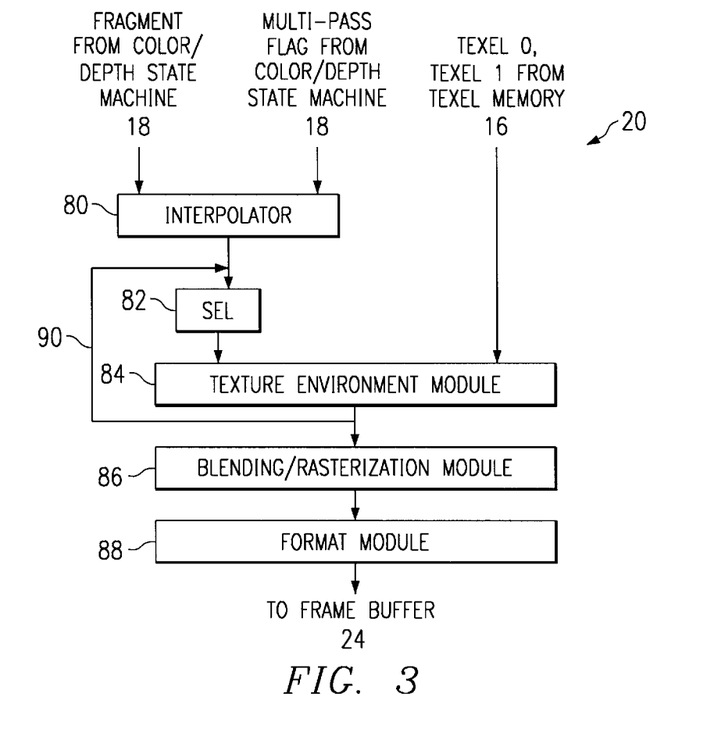
FIG. 3 is a block diagram illustrating an exemplary color pipeline constructed in accordance with the teachings of the present invention.

Color pipeline 20 receives graphics fragments from color/depth state machine 18 and retrieves texels from texel memory 16. In one embodiment, color pipeline 20 uses the tags associated with each texel to retrieve texels corresponding to a particular fragment. Color pipeline 20 also generates a color value for each graphics fragment and combines the color value with texels generated by texture generation pipeline 14 for that fragment. In addition, color pipeline 20 communicates the color value-texel combinations to frame buffer 24. One embodiment of color pipeline 20 is shown in FIG. 3, which is described below.

Depth/stencil pipeline 22 receives graphics fragments from color/depth state machine 18. Depth/stencil pipeline 22 can perform Z-buffering operations on the graphics fragments to determine which graphics fragments or parts of fragments are visible in a graphics image. Depth/stencil pipeline 22 may also perform stencil operations to determine what parts of a graphics object will be stenciled out of an image. In addition. depth/stencil pipeline 22 may perform any number of different or additional graphics operations, such as chromakey operations.

Frame buffer 24 is coupled to color pipeline 20 and depth/stencil pipeline 22. Frame buffer 24 receives and stores graphics data from color pipeline 20 and depth/stencil pipeline 22, including the color value-texel combinations produced by color pipeline 20. System 10 may perform further operations on the graphics data stored in frame buffer 24. System 10 may, for example, use the results from depth/stencil pipeline 22 to determine which color value-texel combinations from color pipeline 20 are hidden by other objects in a graphics image, allowing system 10 to ignore that data. Frame buffer 24 may comprise a portion or all of a memory in or accessible to system 10 such as, for example, memory chips on a video adapter or main memory. Frame buffer 24 may also comprise any hardware, software, firmware, or combination thereof that facilitates storage and retrieval of graphics data.

FIG. 2 is a block diagram illustrating an exemplary texture generation pipeline 14 constructed in accordance with the teachings of the present invention. In the illustrated embodiment, texture generation pipeline 14 comprises a plurality of functional modules 40a–40e, a plurality of selectors 42a–42e, and a plurality of storage areas 44a–44e. Texture generation pipeline 14 also communicates with a texture map database 46.

In the illustrated embodiment, texture generation pipeline 14 receives a graphics fragment and a token from texture state machine 12. The token identifies a texture that texture generation pipeline 14 uses to generate a texel. Texture generation pipeline 14 has access to a plurality of texture contexts 48, each texture context 48 defining the characteristics of a texture. Texture generation pipeline 14 uses the token, retrieves the corresponding texture context 48 identified by the token, and generates a texel using that texture context 48. Texture generation pipeline 14 communicates the texel to texel memory 16.

Each functional module 40 performs one or more texture transformation functions on a piece of graphics data, and the series of functional modules 40a–40e generates a texel for the graphic fragment. Each functional module 40 may comprise any hardware, software, firmware, or combination thereof operable to perform one or more texture transformation functions on graphics data.

In the illustrated embodiment, texture generation pipeline 14 uses five functional modules 40a–40e to generate a texel. Functional module 40a receives a graphics fragment from texture state machine 12 and determines the texture coordinates (known as "s, t coordinates") of the fragment. Functional module 40b receives the texture coordinates and determines a level of detail to use in generating a texel. Functional module 40b may determine the level of detail using, for example, the calculated distance between the object being textured and the viewer. Functional module 4c receives the texture coordinates and the level of detail and determines the texel location (known as "u, v coordinates" of the texel.

Functional module 40d receives the texel location from functional module 4c and communicates with texture map database 46. Texture map database 46 contains different texture maps for each texture identified by texture contexts 48. Each texture map defines an appearance of one of the textures. For example, several texture maps may define the appearance of different portions of a texture. For each portion of the texture, several texture maps may define the appearance of that portion at different levels of detail. Functional module 40d determines which texture map in texture map database 46 most closely resembles texture context 48 when mapped onto the graphics fragment. Functional module 40d instructs texture map database 46 to retrieve the desired texture map and communicate it to functional module 40e. Functional module 40e receives the texture map from texture map database 46, performs filtering operations, and produces a texel. Functional module 40e may, for example, alter the color of the texture map by comparing the texture map to previously-generated texels. Functional module 40e communicates the texel to texel memory 16.

Each selector 42 is coupled to a functional module 40 and a storage area 44. Selector 42 receives a token identifying a texture context 48 that functional module 40 uses to process graphics data. Selector 42 receives the token, retrieves the texture context 48 corresponding to the token from storage area 44, and communicates the texture context 48 to functional module 40. Selector 42 may comprise any hardware, software, firmware, or combination thereof operable to retrieve texture contexts 48.

Each storage area 44 stores a plurality of texture contexts 48. Storage area 44 also communicates with a selector 42 and facilitates retrieval of the texture contexts 48 by selector 42. Each storage area 44 may comprise any of a variety of data structures, arrangements, or compilations operable to store and facilitate retrieval of texture contexts 48. Although each storage area 44 is depicted as residing within texture generation pipeline 14, all or any portion of each storage area 44 could alternatively reside at another location or locations accessible to texture generation pipeline 14.

Texture map database 46 communicates with at least one functional module 40. Texture map database 46 also stores and facilitates retrieval of texture maps by one or more functional modules 40. Texture map database 46 may comprise any of a variety of data structures, arrangements, or compilations operable to store and facilitate retrieval of texture maps. All or any portion of texture map database 46 could reside at one or more locations accessible to texture generation pipeline 14.

By processing graphics fragments using a plurality of functional modules 40, texture generation pipeline 14 processes multiple graphics fragments and/or texture contexts 48 at or near the same time. For example, one functional module 40 may process a graphics fragment and a texture context 48, while another functional module 40 processes the same fragment with a different texture context 48. At or near the same time, yet another functional module 40 may process a different graphics fragment. This may allow texture generation pipeline 14 to quickly generate texels for a large number of graphics fragments and a large number of texture contexts 48. Texture generation pipeline 14 may not need to wait until one fragment and texture context 48 are completely processed before beginning to process another fragment and texture context 48.

While FIG. 2 shows one specific embodiment of texture generation pipeline 14, other embodiments may be used without departing from the scope of the present invention. For example, while five functional modules 40a–40e are used in the illustrated embodiment, those skilled in the art will recognize that any number of functional modules 40 may be used. Also, in the illustrated embodiment, each storage area 44 contains two texture contexts 48, but storage areas 44 may be operable to store any number of texture contexts 48. In addition, storage areas 44 and texture map database 46 may be operable to receive new texture contexts 48 and texture maps, respectively, from system 10. This may allow, for example, system 10 to dynamically update texture generation pipeline 14 so texture generation pipeline 14 can generate texels for new textures.

FIG. 3 is a block diagram illustrating an exemplary color pipeline 20 constructed in accordance with the teachings of the present invention. In the illustrated embodiment, color pipeline 20 comprises an interpolator 80, a selector 82, a texture environment module 84, a blending/rasterization module 86, and a format module 88.

In the illustrated embodiment, color pipeline 20 processes a graphics fragment recursively, combining the same fragment with a different texel during each iteration. Interpolator 80 receives the graphics fragment and generates a color value for the fragment. Texture environment module 84 combines the color value and a texel, producing a color value-texel combination called a "feedback value." In one embodiment, color pipeline 20 uses a multi-pass flag to indicate whether another iteration is needed to combine the feedback value with another texel. The multi-pass flag may, for example, comprise a true-false flag or a counter that is decremented during each iteration. The feedback value and the associated multi-pass flag are passed back to texture environment module 84 over a feedback loop 90. If the multi-pass flag indicates that the feedback value will be combined with another texel, texture environment module 84 combines the feedback value with the next texel. This process may be repeated until the color value is combined with the last texel.

Interpolator 80 receives graphics fragments from color/depth state machine 18 and multi-pass flags associated with the fragments. The multi-pass flag may be associated with the same graphics fragment as that fragment is modified by color pipeline 20. Interpolator 80 generates a color value for each fragment and communicates the color value and the associated multi-pass flag to selector 82. Interpolator 80 may comprise any hardware, software, firmware, or combination thereof operable to receive graphics fragments and generate color values for the fragments. In a particular embodiment, interpolator 80 is operable to generate RGBA color values for each graphics fragment.

Selector 82 is coupled to interpolator 80 and texture environment module 84. Selector 82 receives a color value and an associated multi-pass flag from interpolator 80. Selector 82 also receives a feedback value and an associated multi-pass flag from texture environment module 84 over feedback loop 90. Selector 82 uses the multi-pass flag associated with the feedback value to select an "input value" that is communicated to texture environment module 84. The input value comprises either the color value or the feedback value. If the multi-pass flag associated with the feedback value indicates another iteration is needed, selector 82 selects the feedback value as the input value. Otherwise, selector 82 selects the color value as the input value. Selector 82 may comprise any hardware, software, firmware, or combination thereof operable to receive a color value and a feedback value and select one to communicate to texture environment module 84.

Texture environment module 84 is coupled to selector 82 and texel memory 16. Texture environment module 84 receives an input value from selector 82 and a texel from texel memory 16. Texture environment module 84 also combines the input value and the texel by performing at least one multiplicative or additive graphics operation. One embodiment of texture environment module 84 is shown in FIG. 4, which is discussed below.

Blending/rasterization module 86 is coupled to texture environment module 84 and format module 88. Blending/rasterization module 86 receives color value-texel combinations from texture environment module 84 and performs alpha blending operations and/or rasterization operations on the data. Blending/rasterization module 86 may comprise any hardware, software, firmware, or combination thereof operable to perform alpha blending and/or rasterization operations on graphics data.

Format module 88 is coupled to blending/rasterization module 86 and frame buffer 24. Format module 88 receives graphics data from blending/rasterization module 86 and formats the graphics data for storage in frame buffer 24. In one embodiment, format module 88 formats the graphics data by ensuring that the data has the proper number of bits such as, for example, 16 bits, 24 bits, or 32 bits. Format module 88 may convert graphics data to a single format or to any number of possible formats. Format module 88 may comprise any hardware, software, firmware, or combination thereof operable to convert graphics data from one format to another format.

Figure 4:
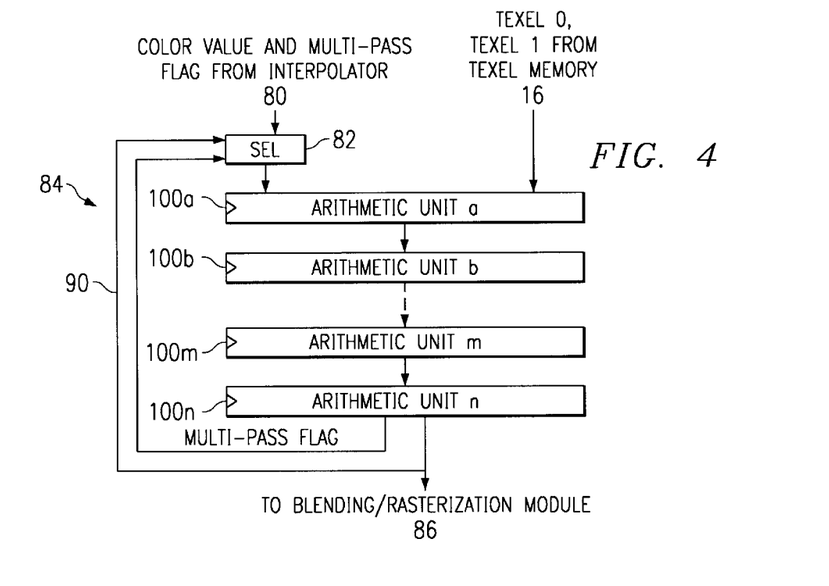
FIG. 4 is a block diagram illustrating an exemplary texture environment module constructed in accordance with the teachings of the present invention.

FIG. 4 is a block diagram illustrating an exemplary texture environment module 84 constructed in accordance with the teachings of the present invention. In the illustrated embodiment, texture environment module 84 comprises a plurality of arithmetic units 100a–100n. Each arithmetic unit 100 performs at least one multiplicative and/or additive graphics operation, and the series of units 100a–100n combines an input value from selector 82 and a texel from texel memory 16.

A first unit 100a receives an input value and a multi-pass flag from selector 82 and a texel from texel memory 16. First unit 100a performs one or more multiplicative and/or additive graphics operations on the input value and the texel. First unit 100a passes the result to the next arithmetic unit 100b. Arithmetic units 100b–100m perform other multiplicative and/or additive graphics operations on the input value and the texel. A last unit 100n receives the result produced by unit 100m. Last unit 100n performs one or more graphics operations to produce a feedback value.

Last unit 100n communicates the feedback value and the associated multi-pass flag to selector 82 along feedback loop 90. If the multi-pass flag indicates that the feedback value will be combined with another texel, selector 82 selects the feedback value as the input value to first unit 100a. Otherwise, selector 82 selects a color value from interpolator 80 as the next input value for unit 100a, and the feedback value produced by last unit 100n is processed by blending/rasterization module 86.

In this embodiment of color pipeline 20, a feedback value may be passed from last unit 100n to first unit 100a. First unit 100a needs time to process the feedback value, and during this time first unit 100a may be unable to process another graphics fragment from color/depth state machine 18. In order to allow first unit 100a to process the feedback value, color/depth state machine 18 performs a stall. Color/depth state machine 18 delays the transmission of another graphics fragment to interpolator 80. During the stall, first unit 100a may process the feedback value, combining it with another texel from texel memory 16. To determine whether a stall is needed, color/depth state machine 18 examines the multi-pass flag associated with the graphics data being processed by last unit 100n. If the multi-pass flag indicates another iteration is needed, color/depth state machine 18 performs a stall. This allows first unit 100a to receive and process a feedback value from last unit 100n. Otherwise, another iteration is not needed, and color/depth state machine 18 may pass another graphics fragment to color pipeline 20.

By using a plurality of arithmetic units 100a–100n, texture environment module 84 may process multiple graphics fragments at or near the same time. For example, each arithmetic unit 100 in texture environment module 84 may process a different graphics fragment. If texture environment module 84 comprises n arithmetic units, texture environment module 84 could process n different graphics fragments at or near the same time. Rather than waiting for one fragment to be combined with multiple texels, system 10 interleaves the fragments in texture environment module 84. If the fragment processed by last unit 100n will be combined with another fragment during an iteration, color/depth state machine 18 performs a stall. System 10 may process more graphics fragments in a given time period, increasing the efficiency of system 10.

Figure 5:
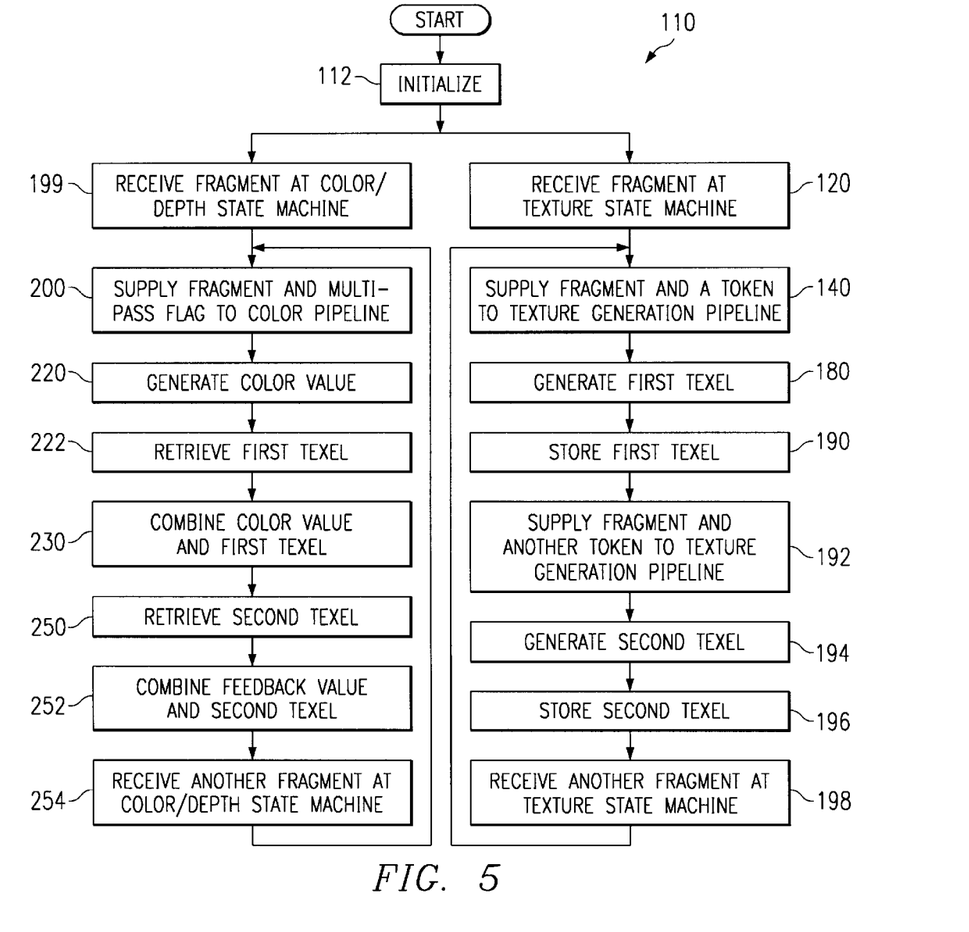
FIG. 5 is a flowchart illustrating an exemplary method of performing multi-texturing operations.
Figure 6:
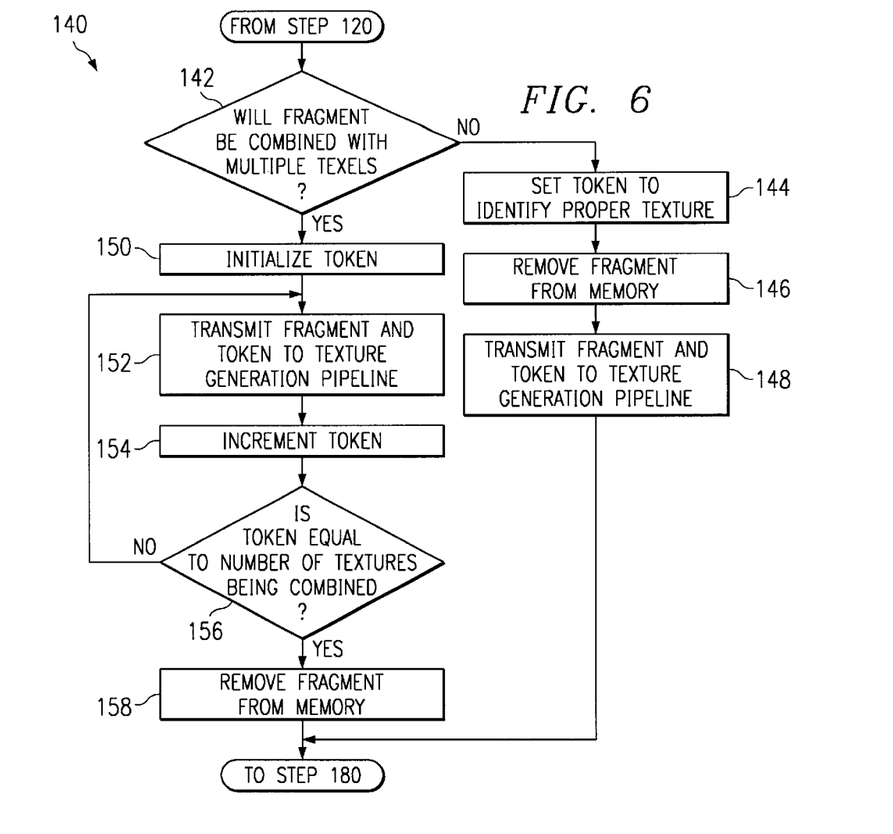
FIG. 6 is a flowchart illustrating an exemplary method for supplying graphics fragments and tokens to a texture generation pipeline.
Figure 7:
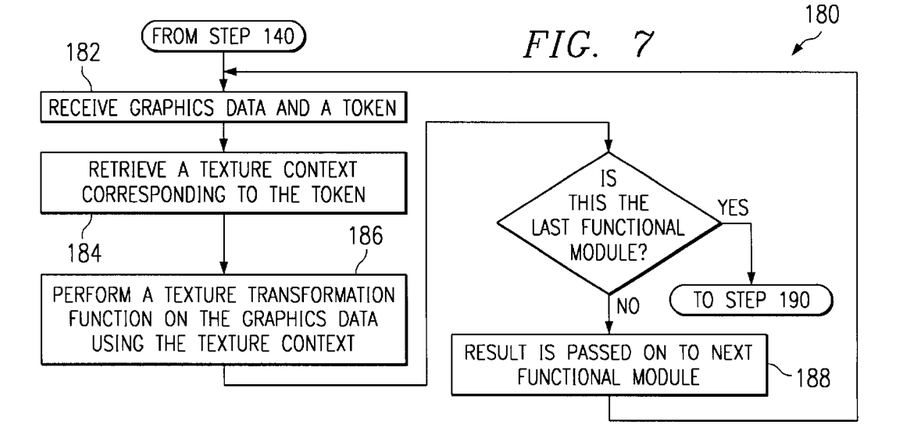
FIG. 7 is a flowchart illustrating an exemplary method for producing a texel.

FIG. 5 is a flowchart illustrating an exemplary method 110 of performing multi-texturing operations. System 10 is initialized at a step 112. This may include, for example, clearing memory 13 in texture state machine 12 and memory 19 in color/depth state machine 18. Texture state machine 14 receives a first graphics fragment at a step 120. Texture state machine 14 supplies the fragment and a token to texture generation pipeline 14 at a step 140. A method for supplying fragments and tokens to texture generation pipeline 14 is shown in FIG. 6, which is described below. Texture generation pipeline 14 generates a first texel at a step 180. A method for generating a texel is illustrated in FIG. 7, which is described below. Texture generation pipeline 14 stores the first texel at a step 190. This may include, for example, communicating the texel to texel memory 16.

Texture state machine 12 supplies the first fragment and another token to texture generation pipeline 14 at a step 192. Texture state machine 12 may use the method illustrated in FIG. 6 to supply the fragment and token to texture generation pipeline 14. Texture generation pipeline 14 generates a second texel for this fragment at a step 194, and the second texel is stored at a step 196.

Texture state machine 12 receives another fragment at a step 198. Although FIG. 5 illustrates the second fragment arriving after texture generation pipeline 14 generates texels for the first fragment, the invention is not so limited. The second fragment may arrive at any time after the arrival of the first fragment. Other fragments may also arrive at texture state machine 12 and be processed by texture environment module 14. In addition, although FIG. 5 illustrates texture generation pipeline 14 generating two texels for each fragment, texture generation pipeline 14 could also generate any number of texels per fragment.

Figure 8:
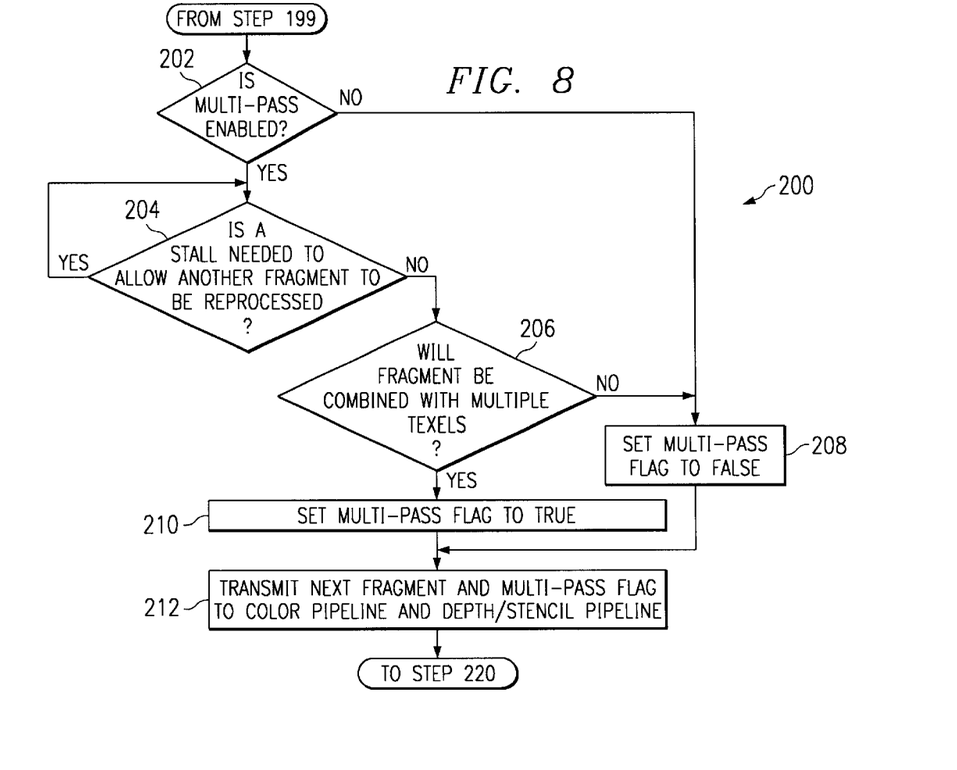
FIG. 8 is a flowchart illustrating an exemplary method for supplying graphics fragments to a color pipeline.

At or near the same time that steps 120 through 198 are occurring, the first graphics fragment may arrive at color/depth state machine 18 at a step 199. Color/depth state machine 18 supplies the first fragment and a multi-pass flag to color pipeline 20 at a step 200. A method for supplying fragments and multi-pass flags to color pipeline 20 is illustrated in FIG. 8, which is described below. Color pipeline 20 generates a color value for the first fragment at a step 220. This may include, for example, communicating the first fragment to interpolator 80, which generates the color value. At a step 222, color pipeline 20 retrieves the first texel generated at step 180. This may include, for example, retrieving the texel from texel memory 16.

Figure 9:
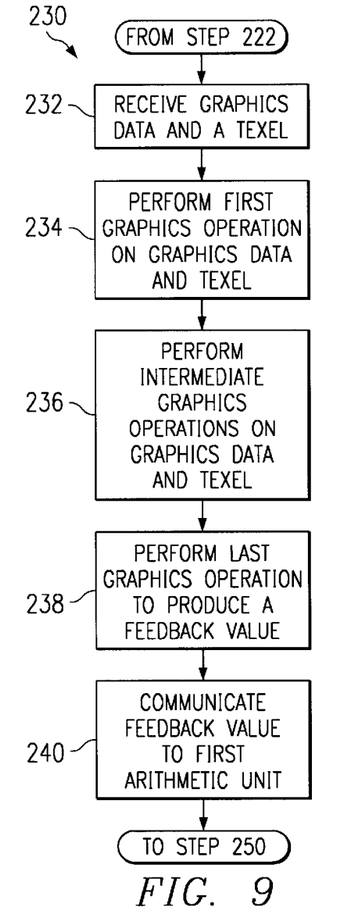
FIG. 9 is a flowchart illustrating an exemplary method for combining a color value and texel.

Color pipeline 20 combines the color value and the first texel at a step 230. A method of combining the color value and texel is illustrated in FIG. 9, which is described below. This may include, for example, producing a feedback value. At a step 250, color pipeline 20 retrieves the second texel generated at step 194. This may include, for example, retrieving the second texel from texel memory 16. Color pipeline 20 combines the feedback value produced at step 230 and the second texel at a step 252. Color pipeline 20 may use the method illustrated in FIG. 9 to combine the feedback value and the second texel. The resulting color value-texel combination may be stored in frame buffer 24.

Figure 10:
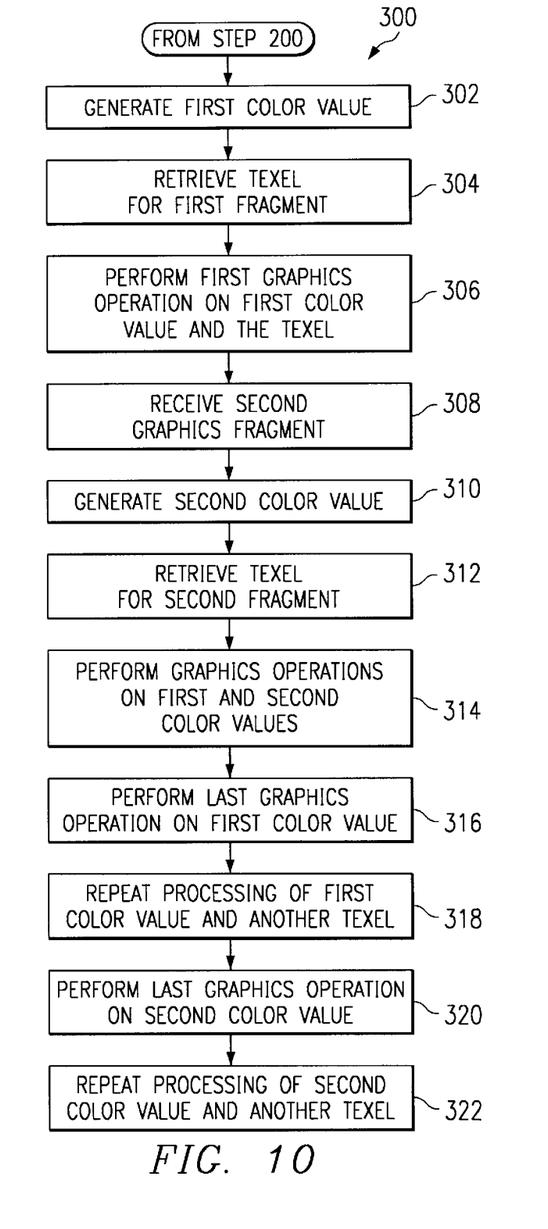
FIG. 10 is a flowchart illustrating an exemplary method for processing multiple graphics fragments.

Color pipeline 20 receives the second fragment at a step 254, and color pipeline 20 may repeat the process. Although FIG. 5 illustrates the second fragment arriving after color pipeline 20 combines the first fragment and the texels, the invention is not so limited. The second fragment may arrive at any time after the arrival of the first fragment, and any number of other fragments may also arrive. Color pipeline 20 may then process multiple fragments at or near the same time. A method of processing multiple fragments is illustrated in FIG. 10, which is described below. The method illustrated in FIG. 10 may replace steps 220 through 254 shown in FIG. 5.

Also, color pipeline 20 may begin combining a fragment with one texel while texture generation pipeline 14 is generating another texel for the same fragment. Color pipeline 20 may not need to wait for texture generation pipeline 14 to generate all texels for a fragment.

FIG. 6 is a flowchart illustrating an exemplary method 140 for supplying graphics fragments and tokens to texture generation pipeline 14. When texture state machine 12 receives a graphics fragment from other components of system 10 at step 120, texture state machine 12 determines whether the graphics fragment will be combined with multiple texels at a step 142. For example, system 10 may map only a single texture onto the fragment, or color pipeline 20 may not allow fragments to be combined with multiple texels. If the graphics fragment will be combined with a single texel, texture state machine 12 determines which texture will be mapped onto the graphics fragment and sets a token to identify that texture at a step 144. Texture state machine 12 removes the fragment from memory 13 at a step 146, and communicates the graphics fragment and the associated token to texture generation pipeline 14 at a step 148.

If the graphics fragment will be combined with multiple texels and color pipeline 20 currently allows multi-pass processing at step 142, texture state machine 14 initializes a token for the fragment at a step 150. In a particular embodiment, texture state machine 12 may initialize each token to a value of zero. Texture state machine 12 communicates the fragment and the associated token to texture generation pipeline 14 at a step 152. The first communication of the fragment and a token may correspond with step 140 in FIG. 5.

Texture state machine 12 increments the token associated with the fragment at a step 154, and compares the incremented token value with the number of textures being mapped onto the fragment at a step 156. In one embodiment, when the value of the token equals the number of textures being mapped onto the graphics fragment, texture generation pipeline 14 has at least started to generate a texel for each of the textures. Texture state machine 12 removes the fragment from memory 13 at a step 158. Otherwise, texture state machine 12 returns to step 152 to communicate the graphics fragment and the incremented token to texture generation pipeline 14. This communication of the fragment and another token may, for example, correspond to step 192 in FIG. 5.

FIG. 7 is a flowchart illustrating an exemplary method 180 for producing a texel. Texture generation pipeline 14 waits to receive a piece of graphics data and a token at a step 180. The graphics data may, for example, comprise a graphics fragment from texture state machine 12. After receiving the graphics data and the token, texture generation pipeline 14 retrieves a texture context 48 identified by the token at a step 184. This may include, for example, selector 42 accessing storage area 44, retrieving the texture context 48 identified by the token, and communicating the retrieved texture context 48 to functional module 40. Functional module 40 performs a texture transformation function on the graphics data using the retrieved texture context 48 at a step 186.

If the functional module 40 that performed the transformation function was the last functional module 40e, the resulting texel is communicated to and stored in texel memory 16 at step 190. If the functional module 40 was not the last functional module 40e, the result is passed to the next functional module 40 at a step 188. The next functional module 40 then repeats the process, receiving and processing the graphics data produced by the prior functional module 40.

Some functional modules 40 may also perform additional steps. For example, functional module 40d may communicate with texture map database 46, requesting that texture map database 46 retrieve a particular texture map. Functional module 40e may receive the texture map requested from texture map database 46.

FIG. 8 is a flowchart illustrating an exemplary method 200 for supplying graphics fragments to color pipeline 20. After receiving a graphics fragment at step 199, color/depth state machine 18 determines whether color pipeline 20 currently allows recursive processing at a step 202. If color pipeline 20 currently does not allow multi-pass processing, color/depth state machine 18 sets a multi-pass flag to indicate that multi-pass processing is not allowed at a step 208. In one embodiment, color/depth state machine 18 sets the multi-pass flag to a value of false. In another embodiment, if the multi-pass flag is a counter, color/depth state machine 18 sets the counter to a value of zero. Color/depth state machine 18 communicates the fragment and the associated multi-pass flag to color pipeline 20 at a step 212. Color/depth state machine 18 may also communicate the fragment to depth/stencil pipeline 22 at step 212.

If color pipeline 20 currently allows multi-pass processing at step 202, color/depth state machine 18 determines whether a stall is needed to allow color pipeline 20 to reprocess a feedback value at a step 204. Color/depth state machine 18 may, for example, examine the multi-pass flag associated with the graphics data being processed by last unit 100n. If that multi-pass flag indicates another iteration is not needed, color/depth state machine 18 may insert the next fragment into texture environment module 84. Otherwise, color/depth state machine-18 stalls, allowing color pipeline 20 to pass the feedback value from last arithmetic unit 100n to first arithmetic unit 100a, before first arithmetic unit 100a receives the next fragment.

If a stall is not needed at step 204, color/depth state machine 18 determines whether the graphics fragment will be combined with multiple texels at a step 206. If the fragment will be combined with a single texel, color/depth state machine 18 sets the multi-pass flag to false at step 208. Color pipeline communicates the fragment and the associated multi-pass flag to color pipeline 20 at step 212.

If the graphics fragment will be combined with multiple texels at step 206, color/depth state machine 18 sets the multi-pass flag to indicate recursive processing is needed at a step 210. In one embodiment, color/depth state machine 18 sets the multi-pass flag to a value of true. In another embodiment, color/depth state machine 18 sets the multi-pass flag to a value equal to the number of texels being combined. Color/depth state machine 18 communicates the fragment and the multi-pass flag to color pipeline 20 at step 212.

FIG. 9 is a flowchart illustrating an exemplary method 230 for combining a color value and texel. Texture environment module 84 receives graphics data and a texel at a step 232. The graphics data may, for example, comprise a color value from interpolator 80 or a feedback value from last arithmetic unit 100n. A first multiplicative and/or additive graphics operation is performed on the graphics data and the texel at a step 234. This may include, for example, first arithmetic unit 100*a* receiving and processing the graphics data and the texel. Intermediate multiplicative and/or additive graphics operations are performed on the graphics data and the texel at a step 236. This may include, for example, arithmetic units 100*b*–100*m* receiving and processing the graphics data and the texel. A last graphics operation is performed on the graphics data at a step 238. This may include, for example, last arithmetic unit 100*n* producing a feedback value. Last arithmetic unit 100*n* communicates the feedback value back to first arithmetic unit 100*a* over feedback loop 90 at a step 240.

FIG. 10 is a flowchart illustrating an exemplary method 300 for processing multiple graphics fragments. After receiving a first fragment at step 200, color pipeline 20 generates a first color value for the first fragment at a step 302. This may include, for example, communicating the fragment to interpolator 80, which generates the color value. Color pipeline 20 retrieves a texel for this graphics fragment at a step 304. This may include, for example, retrieving the texel from texel memory 16. A first multiplicative and/or additive graphics operation is performed on the first color value and the texel at a step 306. This may include, for example, communicating the first color value and texel to arithmetic unit 100*a*.

While arithmetic unit 100*a* is processing the first fragment, color pipeline 20 may receive a second graphics fragment at a step 308. Interpolator 80 generates a second color value for the second graphics fragment at a step 310. Color pipeline 20 retrieves a texel for the second fragment from texel memory 16 at a step 312. Color pipeline 20 may perform graphics operations on both the first and second color values at a step 314. This may include, for example, communicating the results from first arithmetic unit 100*a* to second arithmetic unit 100*b*, and communicating the second color value to first arithmetic unit 100*a*. The first and second color values may be further processed by other arithmetic units 100*c*–100*m*.

A last graphics operation is performed on the first color value at a step 316. This may include, for example, last arithmetic unit 100*n* producing a feedback value. The feedback value is reprocessed by color pipeline 20 at a step 318. This may include, for example, communicating the feedback value and associated multi-pass flag to arithmetic unit 100*a*. A last graphics operation is performed on the second color value at a step 320, which may include last arithmetic unit 100*n* producing a second feedback value. The second feedback value is reprocessed by color pipeline 20 at a step 322, which may include communicating the feedback value and multi-pass flag to first arithmetic unit 100*a* along feedback loop 90.

While FIG. 10 illustrates a method for recursively combining two color values with multiple texels, those skilled in the art will recognize that color pipeline 20 may process more than two graphics fragments. If texture environment module 84 contains n arithmetic units, texture environment module 84 could process n different graphics fragments at or near the same time. Also, while each fragment is combined with two texels in FIG. 10, color pipeline 20 may combine a fragment with any number of texels. Color pipeline 20 could, for example, use the multi-pass flag associated with each fragment to determine if reprocessing is needed at steps 318 and 322.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of performing multi-texturing operations comprising:

generating a first color value corresponding to a first graphics fragment and a second color value corresponding to a second graphics fragment;

generating a first plurality of texels corresponding to the first graphics fragment and a second plurality of texels corresponding to the second graphics fragment;

recursively processing the first graphics fragment by combining an input value comprising the first color value or a first feedback value, and one of the first plurality of texels; and at least beginning to recursively process the second graphics fragment by combining a second input value comprising the second color value or a second feedback value, and one of the second plurality of texels during the recursive processing of the first graphics fragment.

2. The method of claim 1, wherein generating the first and second plurality of texels comprises:

storing a plurality of texture contexts;

receiving one of the graphics fragments and a token identifying one of the texture contexts;

retrieving the texture context identified by the token; and performing a texture transformation function on the graphics fragment using the texture context.

3. The method of claim 2, further comprising:

receiving the same graphics fragment and another token identifying a second texture context;

retrieving the second texture context; and performing a texture transformation function on the graphics fragment using the second texture context.

4. The method of claim 1, wherein combining the first color value and the first plurality of texels and at least beginning to combine the second color value and the second plurality of texels comprises:

processing the first color value at a first arithmetic unit;

communicating a result from the first arithmetic unit to a second arithmetic unit; and processing the first color value at the second arithmetic unit while processing the second color value at the first arithmetic unit.

5. The method of claim 4, wherein processing the first color value comprises performing a multiplicative or additive graphics operation.

6. The method of claim 4, further comprising:

processing the first color value at a last arithmetic unit; and communicating the first feedback value from the last arithmetic unit to the first arithmetic unit, the first feedback value comprising a combination of the first color value and one of the first plurality of texels.

7. The method of claim 6, further comprising receiving the first and second graphics fragments from a state machine, where the state machine is operable to delay the transmission of the second graphics fragment when the first arithmetic unit receives the first feedback value.

8. The method of claim 6, further comprising:

processing the second color value at the last arithmetic unit; and communicating the second feedback value from the last arithmetic unit to the first arithmetic unit, the second feedback value comprising a combination of the second color value and one of the second plurality of texels.

9. The method of claim 1, further comprising storing color value-texel combinations in a frame buffer.

10. A system for performing multi-texturing operations, comprising:
   a texture generation pipeline operable to receive a first graphics fragment and a second graphics fragment, to generate a first plurality of texels corresponding to the first fragment, and to generate a second plurality of texels corresponding to the second fragment; and
   a color pipeline coupled to the texture generation pipeline, the color pipeline operable to receive the first and second graphics fragments and the first and second plurality of texels, to generate a first color value for the first fragment and a second color value for the second fragment, to recursively process the first graphics fragment by combining an input value comprising the first color value or a first feedback value, and one of the first plurality of texels, and to at least begin recursively processing the second graphics fragment by combining a second input value comprising the second color value or a second feedback value, and one of the second plurality of texels during the recursive processing of the first graphics fragment.

11. The system of claim 10, wherein the texture generation pipeline comprises:
   a storage area operable to store a plurality of texture contexts, each texture context identifying at least one characteristic of a texture;
   a selector coupled to the storage area and operable to receive a token, the token identifying one of the texture contexts in the storage area, the selector further operable to retrieve the identified texture context from the storage area; and
   a functional module coupled to the selector and operable to receive the identified texture context from the selector, the functional module also operable to receive one of the graphics fragments and to perform a texture transformation function on the graphics fragment using the identified texture context.

12. The system of claim 10, further comprising a texture state machine coupled to the texture generation pipeline, the texture state machine operable to determine a number of texels to be combined with one of the graphics fragments, to generate a token for each texel, and to communicate the tokens and the graphics fragment to the texture generation pipeline.

13. The system of claim 12, wherein the texture state machine is operable to transmit the graphics fragment to the texture generation pipeline once for each texel to be combined with the graphics fragment, each transmission including the token associated with the texel to be combined with the graphics fragment.

14. The system of claim 10, wherein the color pipeline comprises:
   an interpolator operable to receive the first and second graphics fragments and to generate the first and second color values; and
   a texture environment module coupled to the interpolator, the texture environment module operable to receive the color values and the first and second plurality of texels, to recursively process the first graphics fragment, and to at least begin recursively processing the second graphics fragment.

15. The system of claim 14, wherein the texture environment module comprises:
   at least two arithmetic units including a first unit and a last unit, the first unit operable to receive the input value comprising one of the color values or the first feedback value, the first feedback value comprising a combination of one of the color values and one of the texels, the arithmetic units operable to combine the input value and another texel to produce another feedback value; and
   a feedback loop coupling the first unit and the last unit and operable to transfer the feedback values from the last unit to the first unit.

16. The system of claim 15, further comprising a selector coupling the feedback loop and the first unit, the selector operable to determine the input value and to communicate the input value to the first unit.

17. The system of claim 16, wherein the last unit is operable to inform the selector when the input value comprises the first feedback value.

18. The system of claim 15, further comprising a state machine coupled to the interpolator, the state machine operable to transmit the first and second graphics fragments to the interpolator and to delay the transmission of the second graphics fragment when the input value comprises the feedback value associated with the first graphics fragment.

19. The system of claim 10, further comprising a texel memory coupled to the texture generation pipeline and the color pipeline, the texel memory operable to store at least some of the first and the second plurality of texels.

20. A graphics pipeline for performing multi-texturing operations, comprising:
   an interpolator operable to receive a first graphics fragment and a second graphics fragment, to generate a first color value for the first fragment, and to generate a second color value for the second fragment; and
   a texture environment module coupled to the interpolator, the texture environment module operable to receive the color values and a first and a second plurality of texels, to recursively process the first graphics fragment by combining an input value comprising the first color value or a first feedback value, and one of the first plurality of texels, and to at least begin recursively processing the second graphics fragment by combining a second input value comprising the second color value or a second feedback value, and one of the second plurality of texels during the recursive processing of the first graphics fragment.

21. The graphics pipeline of claim 20, wherein the texture environment module comprises:
   at least two arithmetic units including a first unit and a last unit, the first unit operable to receive the input value comprising one of the color values or the first feedback value, the first feedback value comprising a combination of one of the color values and one of the texels, the arithmetic units operable to combine the input value and another texel to produce another feedback value; and
   a feedback loop coupling the first unit and the last unit and operable to transfer the feedback values from the last unit to the first unit.

22. The graphics pipeline of claim 21, further comprising a selector coupling the feedback loop and the first unit, the selector operable to determine the input value and to communicate the input value to the first unit.

23. The graphics pipeline of claim 22, wherein the last unit is operable to inform the selector when the input value comprises the first feedback value.

24. The graphics pipeline of claim 21, further comprising a state machine coupled to the interpolator, the state machine operable to transmit the first and second graphics fragments to the interpolator and to delay the transmission of the second graphics fragment when the input value comprises the feedback value associated with the first graphics fragment.

25. The graphics pipeline of claim 20, further comprising a blending module coupled to the texture environment module and operable to perform alpha blending operations on color value-texel combinations produced by the texture environment module.

* * * * *

UNITED STATES PATENT AND TRADEMARK OFFICE
CERTIFICATE OF CORRECTION

PATENT NO. : 6,690,381 B1
DATED : February 10, 2004
INVENTOR(S) : Hussain et al.

It is certified that error appears in the above-identified patent and that said Letters Patent is hereby corrected as shown below:

Column 12,
Line 38, delete "machine-18" and insert therefor -- machine 18 --.

Signed and Sealed this

Thirteenth Day of July, 2004

JON W. DUDAS
*Acting Director of the United States Patent and Trademark Office*